June 16, 1936.   G. L. USSELMAN   2,044,749
PHASE ROTATION DETECTOR AND FREQUENCY REGULATOR
Original Filed Dec. 10, 1932   4 Sheets-Sheet 1

Fig.1

INVENTOR
GEORGE L. USSELMAN
BY
ATTORNEY

June 16, 1936.    G. L. USSELMAN    2,044,749
PHASE ROTATION DETECTOR AND FREQUENCY REGULATOR
Original Filed Dec. 10, 1932    4 Sheets-Sheet 2

INVENTOR
GEORGE L. USSELMAN
BY
ATTORNEY

June 16, 1936.  G. L. USSELMAN  2,044,749
PHASE ROTATION DETECTOR AND FREQUENCY REGULATOR
Original Filed Dec. 10, 1932   4 Sheets-Sheet 3

INVENTOR
GEORGE L. USSELMAN
BY
ATTORNEY

June 16, 1936.  G. L. USSELMAN  2,044,749

PHASE ROTATION DETECTOR AND FREQUENCY REGULATOR

Original Filed Dec. 10, 1932  4 Sheets-Sheet 4

INVENTOR
GEORGE L. USSELMAN
BY
ATTORNEY

Patented June 16, 1936

2,044,749

UNITED STATES PATENT OFFICE 2,044,749

PHASE ROTATION DETECTOR AND FREQUENCY REGULATOR

George Lindley Usselman, Port Jefferson, N. Y., assignor to Radio Corporation of America, a corporation of Delaware Original application December 10, 1932, Serial No. 646,674. Divided and this application October 26, 1933, Serial No. 695,287

14 Claims. (Cl. 250—36)

This application is a division of Usselman application #646,674, filed Dec. 10, 1932, which resulted in U. S. Patent #2,018,820, on Oct. 29, 1935 and relates to detectors in general, and more in particular to phase rotation detectors which detect and indicate relative phase rotation between the frequency of two alternating currents. The waves the frequencies of which are to be compared may, for purposes of illustration, be taken from a source of constant frequency wave energy of relatively small amplitude and from a transmitter, that is, the carrier wave of a radio transmitter of considerable amplitude, the object being to maintain the transmitter wave frequency constant without the use of crystal circuits connected therewith, etc.

The constant frequency energy source of comparatively high frequency is connected in phase to the input electrodes of a pair of thermionic tubes in the phase rotation detector. The tubes have their anodes connected in out-of-phase relation to a frequency source to be compared and controlled. The constant frequency source and the source to be controlled should be substantially equal in frequency but in operation it is assumed they may differ by a beat note which may vary between, say, 0 and 10,000 cycles per second. Since the wave the frequency of which is to be controlled is applied to the two anodes in out-of-phase relation (assume about 60° shift) two low frequency beat notes of equal frequency, which may vary if the frequency to be controlled varies, are produced. The beat notes will have a constant phase difference determined by the phase shift between portions of the frequency to be controlled as applied to the anodes of the phase detector tubes. The amount of phase difference between the beat notes never changes though the frequency may change. If the frequency relation between the constant frequency source and the source to be compared and controlled changes from above to below or vice versa the phase relation between the beat notes will change, that is reverse. A reversal of phase relation between the beat notes takes place each time the frequency to be controlled passes through the constant frequency. The anode circuits of the phase rotation detectors are coupled to a tripping circuit which is actuated in one direction or the other by the phase spaced beat note currents of equal but varying frequency in said detector output circuits, the direction of the actuation being determined by the direction of the phase or frequency shift of the frequencies from the transmitter.

The tripping circuit or relay is of the type described in application Serial No. 380,447, filed July 23, 1929, Patent #1,948,103 dated February 20, 1934. The phase detector, as briefly described above, is coupled by way of separate audio frequency transformers to the control elements of two thermionic tubes in the tripping circuit. The two tubes have their anode and control electrodes cross-connected by resistances in such a manner that an increase of current in one anode circuit applies negative potential to the control grid of the other tube and results in a positive decrease in conductivity of the other tube and decrease in the current in the other anode circuit. These tubes are normally biased to a point at which the desired tripping action takes place when the potential on the grids changes. The phase relation between the beat notes determines which tube will be conductive first, and, due to the cross-connected resistances, the instant one tube starts to draw more current, the other tube is biased more negatively and draws less current, and the flow of current is positively tripped to the first tube. This condition maintains until the beat note pulse applied from the phase rotation detector biases the control grid of the other tube to a value to cause it to draw current heavily. This applies negative bias to the control grid of the first tube and trips current to the second tube. The average current through these tubes will be greater in one tube than it will be in the other. The sense of this unbalance is determined by the relative phase rotation of the transmitter and monitor frequencies, as will be explained later in detail.

The tripping circuit, described more in detail hereinafter, includes in its output relay windings connected in opposition so that when the average current predominates in one tube, as briefly described above, one winding is energized excessively and the other winding becomes deenergized to a great extent due to the decrease of anode current in the other tube. The winding may actuate a contact closing member or relay tongue. The relay tongue moves to one side or the other, when unequal currents flow in the windings. The direction of movement depends on which winding is energized more. The relay tongue or contact closing device may in turn control a motor to rotate a tuning element in the transmitter circuit in one sense or the other, the sense in which this tuning element is being turned depending on which tube in the tripping circuit is drawing the most average current. The latter, of course, depends upon the sense of the constant phase difference between the two equal frequency currents or beat notes supplied from the phase rotation detector and resulting from a comparison of out-of-phase and in phase currents in said tubes.

The tripping circuit relay tongue and frequency control circuits are so coordinated that when the average current is greater in one tube it tends to tune the frequency to be controlled toward the frequency of the monitor so that, if the tuning action is continued due to the tripping action of the tripping circuit, the frequency of the source to be controlled will be brought to the frequency of the constant frequency source. If the tripping action continues longer there will be a reversal of phase relation between the beat notes and the average current will be greater in the other tube. This starts the tuning control in the other direction.

Obviously, where said relay circuit is utilized to control a tuning element, failure in any portion of the phase rotation detector, of the reference source, or of the transmitter source might result in the tripping circuit remaining in one position of stability for a time sufficient to move the tuning control entirely out of the range of the phase rotation detector or the tripping circuit, or both.

Novel means is also provided in accordance with the present invention whereby, in case of failure of the currents of varying phase relationship, for any reason whatever, the tripping circuit is thrown out of normal operation so that the output windings again are set in equilibrium or draw equal amounts of currents, possibly of different intensity than during normal operation, so that the relay tongue contact member controlled thereby may, under its spring bias or polarizing bias, return to the normal control position so that the tuning element associated with the circuit to be controlled is not moved. In other words, in accordance with the present invention, the tripping circuit which, as described in the application referred to above, had two positions of stability, has in a sense three positions of stability, that is, the first position where one tube draws excessive current, the second position where the other tube draws excessive current, and the third position where both tubes draw a like amount of current, or no current at all. In the latter case the relay tongue returns, by spring pressure, to a position midway between the two stationary contacts.

The novel features of my invention have been pointed out with particularity in the claims appended hereto.

The nature of my invention and the method of operation thereof will be best understood from the following detailed description thereof and therefrom when read in connection with the drawings, throughout the several figures of which like reference characters indicate like parts, and in which:

Figures 2 to 6 inclusive show modifications of the arrangement of Figure 1;

Figures 7 to 10 inclusive are curves and graphs which serve to explain the theory of operation of the phase detector and tripping circuit; while Figure 11 shows in detail the polarized relay C.

Figure 1:
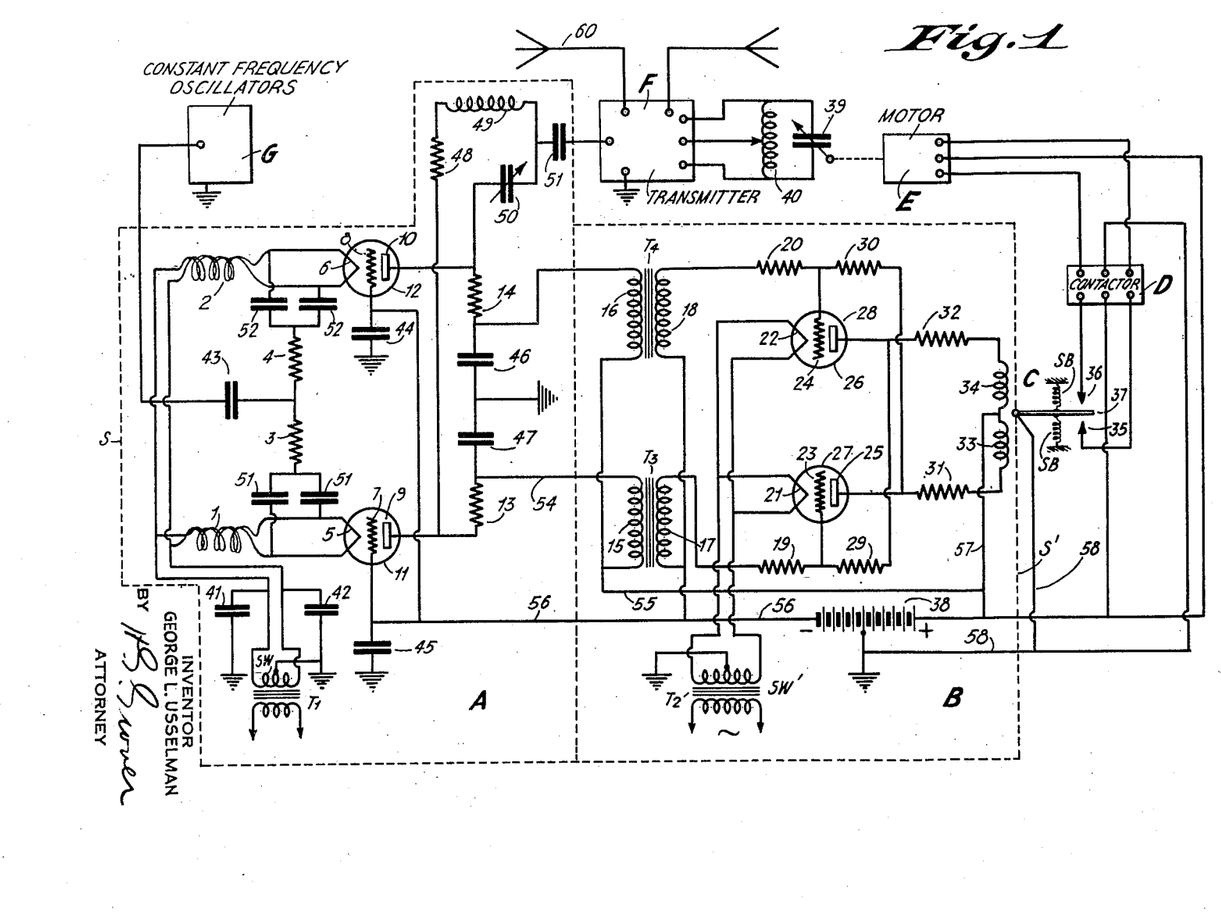
Figure 1 shows a phase rotation detection circuit arranged in accordance with the present invention in combination with a source of constant frequency, a transmitter, or work circuit, the frequency of which is to be compared and controlled, a tripping circuit connected with the phase rotation detector, control means interposed between the tripping circuit and the frequency determining portion of the work circuit.

Before describing in detail the arrangement of Figure 1, it will be noted that in all of the modifications the schematic diagram and the circuits thereof may be divided into seven component parts, which parts have been designated by the reference letters A, B, C, D, E, F, and G.

Part A comprises the elements and circuit of the phase rotation detector circuit described and claimed in my copending application #646,674 of Dec. 10, 1932 Patent #2,018,820 dated Oct. 29, 1935. The remaining parts of the figure show how energy derived from said circuit is used to correct and maintain the proper transmitter carrier frequency.

Part B is the tripping circuit.

Part C is a polarized relay made to operate on relatively small currents.

Part D is a pair of contactors.

Part E is a reversible motor.

Part F is the transmitter whose carrier frequency is to be controlled.

Part G is the monitor oscillator of substantially constant frequency and power. This oscillator may consist of a low frequency oscillator and any suitable number of frequency multipliers or amplifiers, or both.

Detection of the phase shift or direction of phase rotation is accomplished by means of a pair of thermionic triode tubes 11 and 12 having anodes 9 and 10, control grids 7 and 8, and filaments or cathodes 5 and 6 respectively. The filament heating currents for filaments 5 and 6 of tubes 11 and 12 are supplied from the secondary winding SW of filament transformer $T_1$ through the quarter wave length choke coils 1 and 2, as shown in Figure 1. These choking inductances in each of the filament leads are of the electrical length specified for a reason which will appear more in detail hereinafter. These choke coils may be in the form of double conductors, one for the supply and the other for return of the filament current. The midtap of the secondary winding SW of transformer $T_1$ is connected as shown directly to ground. The ends of choking inductances or coils 1 and 2 adjacent the transformer $T_1$ are grounded for radio frequency potentials through by-pass condensers 41 and 42 as shown. One end of resistor 3 is connected for radio frequency to both sides of filament 5 of tube 11 through condensers 51—51. The corresponding end of resistor 4 is connected for radio frequency potentials to both sides of filament 6 of tube 12 through condensers 52—52. The other ends of resistors 3 and 4 are connected together and to the oscillator G through the blocking condenser 43.

The grid electrode 7 of the tube 11 is connected to ground for radio frequencies through the condenser 45. Grid electrode 8 of tube 12 is connected to ground for radio frequencies through condenser 44. Grids 7 and 8 are both connected together and to the negative end of power source 38 by way of lead 56. The anode electrode 9 of triode tube 11 is connected to one end of the resistor 13. The other end of resistor 13 is connected to ground for radio frequency potentials by way of the condenser 47. The anode electrode 10 of tube 12 is connected to one end of resistor 14. The other end of resistor 14 is connected to ground for radio frequency oscillations by way of condenser 46. The anode electrode 9 of tube 11 is also connected to a point of high frequency potential in the transmitter F through the resistor 48 and the phase retarding element 49, and the blocking condenser 51. The anode electrode 10 of tube 12 is connected to transmitter F through the phase advancing element 50 and the blocking condenser 51. In other words, phase shifting elements 49 and 50 are both connected through blocking condenser 51 to transmitter F.

The two output leads 53 and 54 of phase rotation detectors 12 and 11 are connected to the output circuit between resistor 14 and condenser 46 and between resistor 13 and condenser 47 respectively.

The output of the phase rotation detector is connected to the input of tripping circuit B. The nature and operation of a tripping circuit similar in some respects to this one has been set forth in considerable detail in U. S. application Serial No. 380,447, filed July 23, 1929, Patent No. 1,948,103, issued Feb. 20, 1934, and in Finch U. S. Patent No. 1,844,950, issued Feb. 16, 1932. A brief description of the tripping circuit will be given herein. Leads 54 and 53 from the circuit in unit A are connected to the primary windings 15 and 16 of transformers $T_3$ and $T_4$ respectively. The other ends of windings 15 and 16 are connected to the positive end of power source 38 by way of lead 55 to supply positive potential to the anodes of tubes 11 and 12 respectively. One end of the secondary windings 17 and 18 of transformers $T_3$ and $T_4$ is connected to resistors 19 and 20 respectively. The other ends of windings 17 and 18 are connected by lead 56 to the negative end of power source 38.

The cathode electrodes 21 and 22 of tubes 27 and 28 are both connected to the secondary windings SW' of filament transformer $T_2$. The midpoint of this secondary winding SW' is connected directly to ground. The other ends of resistors 19 and 20 are connected to the grid electrodes 23 and 24 of thermionic tubes 27 and 28 respectively. The grid electrodes 23 and 24 are also connected to resistors 29 and 30 respectively. The other ends of resistors 29 and 30 are cross connected to the anode electrodes 26 and 25 of tubes 28 and 27 respectively, as shown.

The anode electrodes 25 and 26 are also connected to resistors 31 and 32 respectively. The other ends of resistors 31 and 32 are connected to the coils 33 and 34 of polarized relay C, as shown in Figure 1. The other ends of relay coils 33 and 34 are connected together and to the positive end of power source 38 by way of lead 57. The tongue 37 of relay C is normally biased to a neutral position by springs SB and is connected to ground G by way of the lead 58. The showing of the biasing means SB for normally maintaining the relay tongue 37 in a non-contact closing position is purely illustrative, and in no way limiting. In an embodiment constructed and operated a polar relay of the standard Western Electric type was used. In this relay the tongue 37 is as shown in Figure 11, an extension of a flat spring rigidly fastened to a permanent magnet PM. The tongue 37 extends between north and south poles N and S of the magnet to cooperate with the contacts 35 and 36. The armature or tongue 37 is magnetized by the windings 33 and 34 in the output circuits of the tripping circuit. The windings 33 and 34 may be mounted or supported around the armature 37 which they magnetize. This relay may be and preferably is incorporated in each of the control circuits shown in Figures 1 to 6 inclusive of the drawings. Contacts 35 and 36 of relay C are connected to the coils (not shown) of two contactors in unit D. The contacts of the two contactors in D are connected between the power source 38 and motor E, as shown. The nature of contactors D and reversible motor E is not shown since they may be of any suitable type.

The shaft 59 of motor E is connected to operate and change the capacity of tuning condenser 39 or other tuning devices. The tuning condenser 39 determines in some suitable manner the transmission frequency sent out by transmitter F. The coil 40 and condenser 39 may constitute a tuned tank circuit which, by means not shown here, controls the frequency of oscillations in transmitter F. 60 represents the work circuit which may be an antenna connected to transmitter F. Other load circuits may replace the antenna 60.

Transformers $T_1$ and $T_2$ are supplied with 60 cycle power from some external source. An intermediate point of power source 38 is grounded, as shown in Figure 1, so as to provide a source of both positive and negative voltage.

Assume that all cathodes are properly heated and that all grids and anodes are provided with proper potentials. Also assume that power of constant frequency and substantially constant amplitude is being supplied from G and that transmitter F is operating within the range of this frequency comparing and correcting device, i. e., has a frequency equal to the frequency of the source G or differing from the frequency of source G by less than 10,000 cycles per second.

Cathodes 5 and 6 of tubes 11 and 12 will receive high frequency alternating voltage from the reference source G through condenser 43, resistors 3 and 4, and blocking condensers 51—51, 52—52. This excitation voltage is prevented from escaping to ground by the action of the choke coils 1 and 2, which are electrically substantially one-quarter wave length long with respect to the monitor frequency from G. Since grids 7 and 8 are negative with respect to cathodes 5 and 6 and are grounded for alternating currents and voltages, the excitation energy supplied to the cathodes will be repeated and amplified by the action of tubes 11 and 12 so that a greater amount of energy of the monitor frequency appears on the anodes 9 and 10 of tubes 11 and 12. Since the excitation voltage on the like cathodes is cophasal, that is, of like phase, the amplified energy of monitor frequency appearing on anodes 9 and 10 will also be cophasal.

Anodes 9 and 10 are also supplied with alternating voltage or excitation energy from the transmitter F through the phase shifting elements 39 and 50. The frequency of this energy usually will be a little higher or lower than that of the monitor G. The phase shifting elements 49 and 50 are set to split the phase of the transmitter excitation on anodes 9 and 10, at the optimum angle for best efficiency of the detector. I will assume, for the sake of argument, that this phase shift is 60 degrees. In other words, the excitation from the transmitter F on anode 10 is advanced 30 degrees by the phase shifting element 50 while the excitation on anode 9 from transmitter F is retarded 30 degrees by the phase shifting elements 48 and 49. Resistor 48 is for the purpose of equalizing the resulting excitation through the phase shifting elements 49 and 50 on the anodes, which would otherwise be unbalanced due to the effect of plate to grid capacity in tubes 11 and 12. The manner in which this equalizing action takes place has been set forth more in detail in my United States application Serial No. 623,558, filed July 20, 1932.

The current flowing in anodes 9 and 10 of tubes 11 and 12 will both be modulated by both the monitor frequency and the transmitter frequency. If there is a normal amount of frequency difference between the transmitter and the monitor, equal audio or low frequency beat notes will appear in the anode currents of both tubes 11 and 12. However, the audio components in these two tubes will have a 60 degree phase difference due to the assumed 60 degree phase difference in the excitation by the oscillations from transmitter F on each anode.

In proceeding further with the theory of the invention, reference will be made to Figure 7. The phase rotation detector cathodes are each supplied with radio frequency current and voltage of equal amount and like phase from the substantially constant frequency oscillator or monitor. This energy may be represented by the vector M in Figure 7. The anodes of the phase rotation detector each receive equal amounts of radio frequency current and voltage from the transmitter whose frequency is to be controlled and compared with the monitor frequency. However, the two portions of the energy supplied to the anodes from the transmitter pass through two phase shifting devices so that the phase of the energy supplied to one anode is advanced a certain amount and the phase of the energy supplied to the other anode is retarded or lags a certain amount. The portions of energy supplied to the first anode may be represented by vector 10 in Figure 7, and the portion of energy supplied to the second anode may be represented by the vector 9 in Figure 7. Now I may assume that the frequency of rotation of monitor vector M is $F_1$, and that the frequency of rotation of both vectors 9 and 10 (transmitter frequency) is $F_2$. But since there is a constant phase displacement between the two portions of energy supplied by the transmitter to the two anodes of the phase rotation detector tubes, I can represent the lagging portion, or vector 9, as having a frequency and phase relation of $F_2 - \theta/2$ and the leading portion, or vector 10, as having a frequency and phase relation of $F_2 + \theta/2$. The total phase difference between portions 9 and 10 is $\theta$. This is constant and is fixed by the phase shifting elements 48, 49 and 50.

The side bands of these two frequencies may be represented by $F_1 + F_2$, and $F_1 - F_2$ or $F_2 - F_1$. I am interested only in the lower frequencies $F_1 - F_2$ and $F_2 - F_1$. If frequency $F_1$ is higher than $F_2$ then the low frequency beat note will be $F_1 - F_2$. If frequency $F_2$ is higher than $F_1$ then the low frequency beat note will be $F_2 - F_1$. This can be visualized by considering vectors 9 and 10 as standing still and for frequencies where $F_1$ is higher than $F_2$, vector $F_1$ will rotate counter clockwise at an audio or beat frequency rate of $F_1 - F_2$. Likewise, for frequencies where $F_2$ is higher than $F_1$ the vector $F_1$ will rotate clockwise at a beat frequency rate of $F_2 - F_1$.

Now consider frequency $F_1$ higher than $F_2$ (counter clockwise rotation of vector M relative vectors 9 and 10), the beat frequency of vectors M and 9 will be $F_1 - (F_2 - \theta/2)$ and the beat frequency of vectors M and 10 will be $F_1 - (F_2 + \theta/2)$. This gives two equal beat frequencies having a phase difference of angle $\theta$. In this case the beat frequency of vectors M and 9 is leading that of vectors M and 10 by the angle $\theta$.

However, when frequency $F_2$ is higher than $F_1$, vector M rotates clockwise, relative to vectors 9 and 10, at beat frequency rate and by the same process of reasoning it can be seen that we will again have two equal beat frequencies having a phase difference of angle $\theta$, but in this case the beat frequency of vectors M and 10 is leading that of vectors M and 9 by the angle $\theta$.

It should be noted that as the transmitter frequency changes relative to the monitor frequency the frequency of both beat notes (phase rotation detector outputs) change but are always equal and have a constant phase difference. The phase relation of the two beat notes reverses as the beat frequency passes through zero. This is evident by considering the rotation of vector M relative to vectors 9 and 10, as pointed out above. The amplitude relations of these energies can be obtained by addition of the vectors in the usual manner. This would give two sine waves $a$ and $b$ having a phase difference of $\theta$ as illustrated in Figure 8.

The alternating component of one portion of the energy delivered by the detector passes through transformer $T_3$ in Fig. 1 to the tripping circuit, and the alternating current component of the other portion of the energy delivered by the detector passes through transformer $T_4$ in Figure 1 to the tripping circuit. It should be remembered that transformers of iron core type also act as filters, that is, they are very inefficient or will not pass extremely high or very low frequency energy.

If the amount of phase split is increased or decreased, the amount of phase difference in the low frequency components of current in anodes 9 and 10 will be correspondingly increased or decreased.

These two out of phase low frequency components are transmitted to the tripping circuit B over the lines 53 and 54. Resistors 13 and 14 serve as a load on tubes 11 and 12. Radio frequencies are by-passed to ground through condensers 47 and 46, but these condensers are small and act as a high impedance for low frequencies so that the latter are passed on to the next stage, while the high frequencies are absorbed by resistors 13 and 14 and condensers 47 and 46.

The audio output of detector tube 11 passes through the primary winding 15 of transformer $T_3$ and the audio output of detector tube 12 passes through the primary winding 16 of transformer $T_4$. This audio voltage is here transformed and again appears in the secondary windings 17 and 18 of transformers $T_3$ and $T_4$.

Now the action of tripping circuit B is that when there are no disturbing variations in the circuit voltages, only one of tubes 27 or 28 will draw current. When the plate and grid voltages are first applied, both tubes will start to draw current, but due to the constants and peculiarities of this circuit, the first tube drawing the more current will cause the second tube to be biased to cutoff. The second tube, which is being cut off, will cause the grid of the first tube to become more positive. The result is that the current will positively trip to one tube. If the grid of the second tube, which is not drawing current, be given a positive kick sufficient to overcome the first tube which has been drawing current, the circuit current will trip to the second tube and stay locked in the last position until a positive kick on the grid of the first tube again restores it to the original condition. If I put two equal alternating voltages on transformers $T_3$ and $T_4$, sufficient to operate the tripping circuit, and having 180 degrees phase difference, the average current in each side of the tripping circuit will be equal. Now if I change this phase difference to 60 degrees, as I have assumed in this case, the currents on the two sides of the tripping circuit will be unbalanced. The tube with leading phase will carry current the smaller part of the cycle and the tube with lagging phase will carry current the larger part of the cycle. This unbalance is caused by the fact that each tube carries current over the phase angle until the next tube trips the circuit. Thus in the assumed phase adjustment the leading tube and lagging tube would have an average current ratio of about 60/300 if other constants in the circuit do not tend to decrease this ratio.

Figure 9:
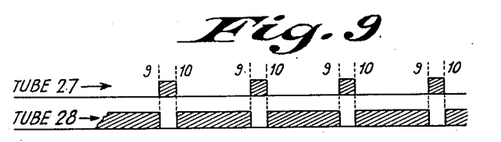

The phase rotation detector supplies two alternating voltages to the tripping circuit. These two alternating current voltages can be adjusted to have a phase difference of less than 180 degrees as I have explained before and I have assumed a setting of 60 degrees. Also, as the transmitter frequency passes through the monitor frequency, the position of leading and lagging phase is reversed. This causes the tripping circuit current to become unbalanced in the opposite direction. This operation will be better understood if we assume an instant in the operation of the tripping circuit when tube 28 is drawing current and tube 27 is blocked off, and that frequency $F_1$ is higher than $F_2$. When the vector sum of vectors M and 9 become great enough, the potential of grid 23 of tube 27 will be "kicked" far enough positively to overcome the locking bias imposed on it by tube 28. Instantly the circuit trips so that tube 27 is now drawing heavy current and tube 28 is blocked off. This locked condition continues until vector M (still rotating counter clockwise) approaches vector 10. When the vector sum of vectors M and 10 becomes great enough the potential of grid 24 of tube 28 will be "kicked" far enough positively to overcome the locking bias imposed on it by tube 27. Again the circuit instantly trips so that tube 28 now draws heavy current and tube 27 is blocked off. The circuit now stays tripped or locked in this position until vector M rotates around the major part of the revolution and again approaches vector 9 when the cycle will be repeated. In other words, tube 27 draws current over the angle $\theta$ and tube 28 draws curent over the angle $360-\theta$. Figure 9 illustrates the blocks of current drawn by the tubes in the tripping circuit when frequency $F_1$ is higher than $F_2$.

Figure 10:
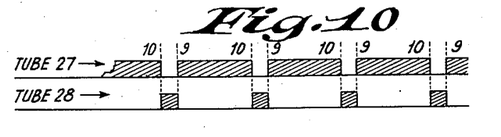

If frequency $F_1$ is lower than $F_2$ the vector M will rotate, as explained before, clockwise relative to vectors 9 and 10. Using the same line of reasoning as above, tube 28 now draws current over the angle $\theta$ and tube 27 draws current over the angle $360-\theta$. Figure 10 illustrates the blocks of current drawn by the tubes in the tripping circuit when frequency $F_1$ is lower than $F_2$.

Since the anode currents of the tripping circuit pass through the coils of the relay C, as shown in Figure 1, the relay tongue 37 will be thrown on one side or the other. This operates the contactors D through either contact 35 or 36 of relay C, depending on the position of the relay tongue 37. Contactors D may be connected to the reversible motor E so that it will operate always to correct the frequency of transmitter F through the tuning means 39.

If we employ a constant frequency oscillator G, the phase rotation detector circuit A operating through tripping circuit B, relays C and D and motor E, will operate to maintain substantially constant frequency in the transmitter F.

Referring again to Figure 1, the reason for using three element tubes instead of screen grid tubes in the phase rotation detector circuit A is that the three element tube is a much better detector, especially when excitation must also be applied to the anode of the tube. The three element tube gives much greater detector response. The purpose of the radio frequency grounded grids of these tubes is to introduce electrostatic shielding between the anodes and the cathodes. This uncouples or rather prevents capacitive coupling between the oscillator G excitation on the cathodes and the transmitter excitation on the anodes. There is some coupling between the cathode and the anode due to the tube current but this does not cause any trouble, and it is relatively small compared with the capacitive coupling which would exist at high frequencies if the grids were not grounded.

I have not stated previously the purpose of resistors 3 and 4. These resistors absorb some of the monitor energy and are detrimental to a small extent but they are quite necessary to reduce the coupling between cathodes 5 and 6. If the cathodes are closely coupled together, the anodes 9 and 10 will also be sufficiently coupled together through the tube currents to interfere with the action of the phase splitting circuits. The use of resistors 3 and 4 reduces this coupling to a value which is no longer noticeable. Resistors 13 and 14 also serve to reduce the coupling between anodes 9 and 10 and thereby improve the action of the phase splitting circuits containing elements 48, 49 and 50.

In practice it is preferable that non-inductive resistances be used in circuit B and imperative that non-inductive resistances be used in circuit A for proper operation of the invention at high frequency. In other words, all of the resistances connected with tubes 11, 12, 27 and 28 should be non-inductive, while all of the resistances connected with tubes 11 and 12 must be non-inductive to obtain best results.

The specific embodiment of the present invention, as illustrated in Figure 1, may be modified by using either an inductance and a capacity for phase shifting elements 49 and 50, or I may use lines of different electrical length for this purpose, as illustrated in my United States application Serial No. 607,932, filed April 28, 1932, Patent No. 2,036,164 dated March 31, 1936. Other circuit modifications may be made without departing from the scope of the invention.

When the phase detecting means, as illustrated in Figure 1, is used to check the frequency of a telegraph transmitter having a single oscillator stage, no excitation voltages are supplied to the phase detector by the transmitter when the transmitter is not keyed. During long intervals between signals this might permit the tripping circuit B to run the frequency determining condenser 39 past the point at which it tunes its circuit to the correct frequency. The condenser 39 might tune the circuit to a frequency out of the frequency range of the frequency regulator circuit A—B. Under these circumstances the tripping circuit current will continue to flow in that tube 28 or 27 in which it was last caused to flow by the action of the phase rotation detector circuit 11, 12, 13, 14 etc.

The same thing occurs if the excitation voltage from monitor G for any reason fails. Also when the transmitter F is keyed or, rather, when the key in F is opened and the signal from the transmitter is stopped, transformers T₃ and T₄ often give a reverse kick or pulse of current which reverses the action of the tripping circuit B, and during this time when the signal is off, condenser 39 is turned the wrong direction for correcting the frequency of the transmitter F. This action continues until the signal is again put on, at which time the frequency of the transmitter F may be completely outside of the operative frequency range of the regulator circuit. In order to stop this incorrect operation of the frequency regulator it is necessary to stop the action of the tripping circuit B when the phase rotation detector A is not producing proper output potentials.

Means are provided in accordance with the present invention to stop the action of the tripping circuit B when there is no output from the phase rotation detector A or when its output frequency is above or below the range of transformers T₃ and T₄.

Figure 2:
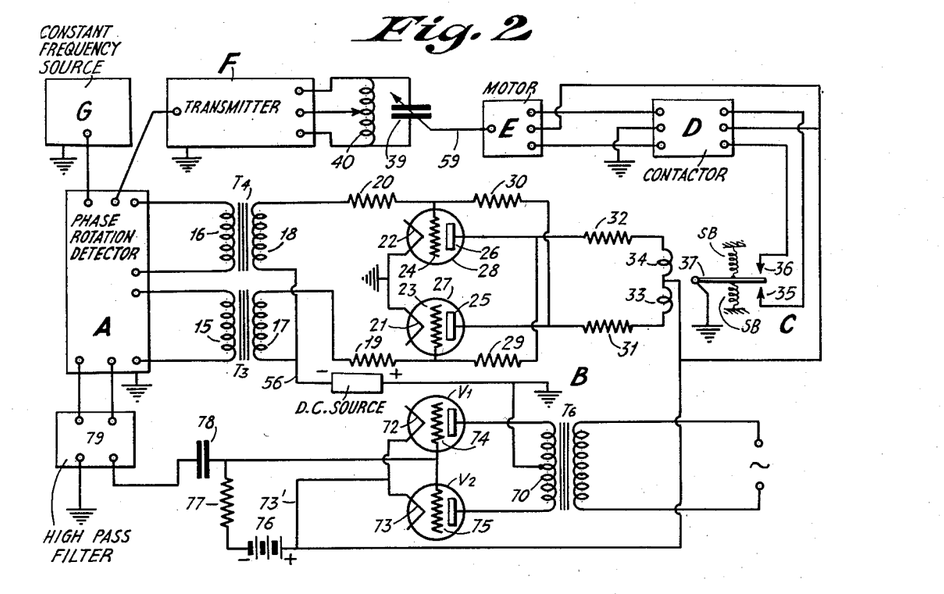

In Figure 2 of my copending application I have shown means whereby the tripping circuit B used with a telegraph transmitter is prevented, even under adverse conditions, from running the condenser 39 to a point at which it tunes the transmitter to a frequency outside of the range of the regulator.

In case the monitor oscillator or circuits between said oscillator and the phase detector A fails, the tripping circuit may cause the condenser 39 to tune the transmitter to a frequency outside of the regulator range. To prevent this from taking place the arrangement of Figure 2 may be used. In Figure 2 a thyratron rectifier, comprises two tubes V₁ and V₂ with their plate electrodes grounded through the center tap of the secondary winding 20 of the transformer T₆, the primary winding of which may be connected to any low frequency source of energizing current. The cathodes or filaments (positive terminal) 72 and 73 of V₁ and V₂ are connected by lead 73' to the relay coils 33 and 34 in the tripping circuit and supply rectified alternating current to the anodes of the tubes 27 and 28 of the tripping circuit. The grids 74 and 75 of the thyratron tubes V₁ and V₂ are normally biased to cut-off by the negative voltage source 76 connected thereto by way of resistance 77, and they also receive excitation potentials from the phase rotation detector A. These potentials may be received directly from A or, if desirable, through a 200 cycle high pass filter 79, as shown, and through a blocking condenser 78, or an audio frequency transformer not shown in the figure.

When the phase rotation detector operates, excitation is supplied by way of 78 to the rectifier grids 74 and 75 so that rectification of the alternating current applied from transformer 70 to the plates of V₁, V₂ takes place on the positive excitation peaks. This rectified current potential is applied from the cathodes 72 and 73 to the tripping circuit by lead 73', thereby allowing the tripping circuit to operate in a normal manner. If either the monitor G or the transmitter F stops, this thyratron rectifier will also stop since no excitation is supplied to the grids thereof from A. This prevents the tripping circuit from operating unless G, F and A are operating normally. In some cases this circuit may not be satisfactory because of the ripple produced by the rectifier. Of course, smoothing circuits could be applied but then the rectifier might not follow the transmitter keying sufficiently close to obtain the best results.

Figure 3:
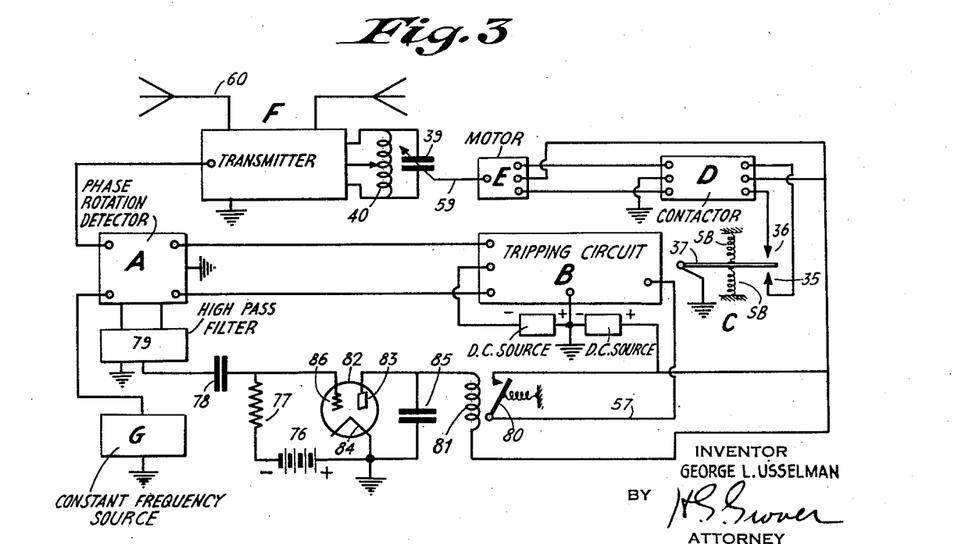

In Figure 3, I have disclosed an arrangement which includes all of the desirable features of the arrangement of Figure 2 and none of the defects thereof. In Figure 3 the plate power supply lead 57 of the tripping circuit passes through the normally closed contacts 80 of a direct current relay. The actuating winding 81 of this relay is in the anode circuit of tube 82 and in this winding flows the current to the anode 83 of relay tube 82. The filament 84 of tube 82 is connected to ground as shown and to a filament power supply source not shown. A by-pass condenser 85 allows the audio component of the anode to filament current to flow directly from anode 83 to cathode 84. The tube 82 is biased to cut-off by maintaining a proper negative voltage on grid 86 from bias source 76 through resistor 77. The grid 86 of tube 82 receives excitation voltage from the phase rotation detector through the high pass filter 79 and direct current blocking condenser 78. Here, as in Figure 2, a coupling transformer may be used in place of the condenser 78 etc. shown to couple the high pass filter to the grid electrode 86 of tube 82. The high pass filter may have a lower limit of approximately 200 cycles per second.

In operation, since tube 82 is normally biased to cut-off when no excitation voltage is applied from A, tube 82 will not rectify or pass anode to cathode current and contact 80 will be open as shown. When the grid electrode 86 receives excitation voltage from A by way of the high pass filter 79 the normal blocking bias will be overcome and tube 82 will pass current. This current energizes coil 81 and causes it to actuate its armature 80 to close the path between the anode of the tripping circuit and the anode source 38. This allows the tripping circuit to function. When the excitation voltage from A stops tube 82 is biased to cut-off by 76 and 77 and the tripping circuit also ceases to function since the current in lead 57 is interrupted. The high pass filter blocks off all low frequency so that the frequency regulator stops regulating through a band 400 cycles wide about the correct frequency, as determined by the frequency of the source G.

In practice it has been found that the relay 81, 80 of this circuit may not in all cases be sensitive enough to follow the high speed keying operations. A regulator circuit of the type described hereinbefore, and which includes all of the advantages of the arrangements described before and, in addition, a control means sensitive enough to respond to high speed keying, has been illustrated in Figure 4. In this modification of the frequency regulator circuit, the biasing voltage for the control electrodes 23 and 24 of tubes 27 and 28 in the tripping circuit is supplied from the common source 38 through the anode to cathode impedance of tube 88 and the primary winding P of transformer T. The cathode electrode 89 of tube 88 is connected to the negative terminal of the common biasing source 38, while the anode 90 of tube 88 is connected as shown to the winding P of transformer T. One end of the secondary winding S of transformer T is connected as shown to the cathode 89 of tube 88. The other end of secondary winding S is connected through the filter condenser 91 and negative bias source 92 to the grid 93 of tube 88. Load resistor R₁ is connected as a load across the secondary winding S of transformer T. The resistance R₂, which may be replaced by a reactor, completes the direct current circuit between the positive end of bias source 92 and cathode 89 of tube 88. By-pass condenser 94 furnishes an alternating current path for the grid to cathode circuits of tubes 27 and 28 around the impedance of tube 88.

Figure 4:
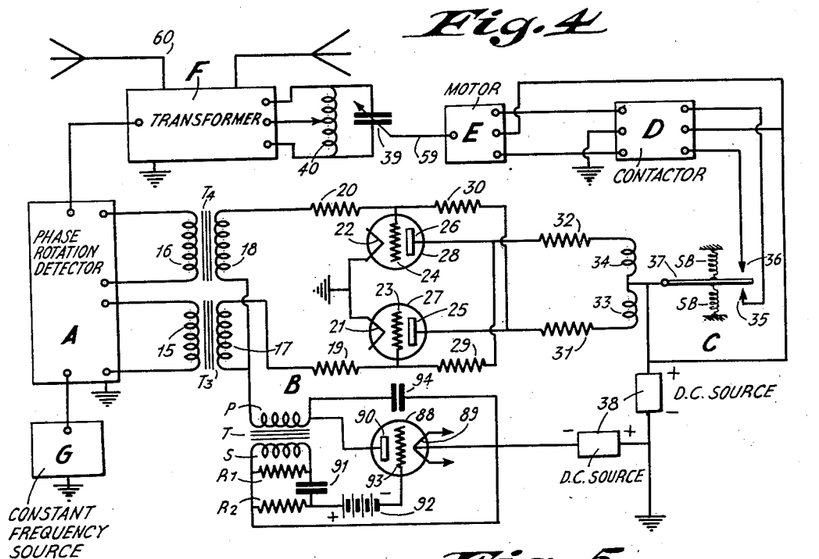

When there is no energy in the output of the phase rotation detector, tube 88 is blocked to cut-off by source 92 so that the direct current biasing circuit of tubes 27 and 28 includes the high impedance of the tube 88 and the negative bias voltage is cut-off from the tubes 27 and 28 in the tripping circuit. Consequently, the grids of tubes 27 and 28 remain at equal positive potential. Under these conditions the tubes 27 and 28 in the tripping circuit carry equal current and no tripping action takes place and the tongue 37 of the polar relay remains in its spring biased neutral position and no frequency regulation takes place. As soon as there is audio output from the phase rotation detector unit, which takes place when the transmitter frequency increases or decreases with respect to the reference frequency, tube 88 passes current. This action takes place because the alternating current from the phase detectors is applied to the transformer T and from there to the grid 93 of tube 88 to overcome the normal negative bias applied thereto. Tube 88 becomes conductive and the grid to cathode circuit of the tripping circuit is supplied with normal negative bias instead of positive bias. Under these circumstances a change in phase relationship of the audio currents in $T_3$, $T_4$ starts a tripping action in 23 and 24. Consequently, the tripping circuit functions to operate the relay and frequency correction occurs when necessary. This circuit has proven successful and desirable in operation.

Figure 5:
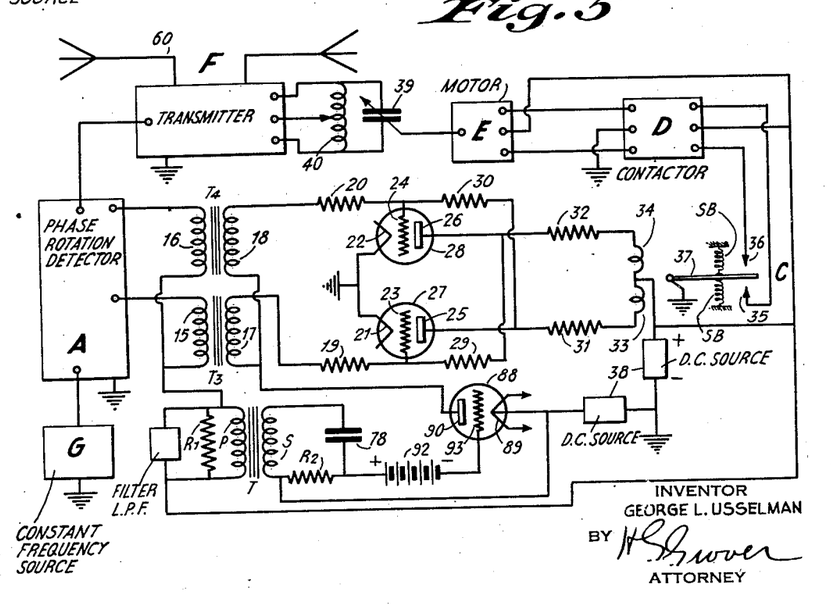
Figures 6, 7, 8, 11:
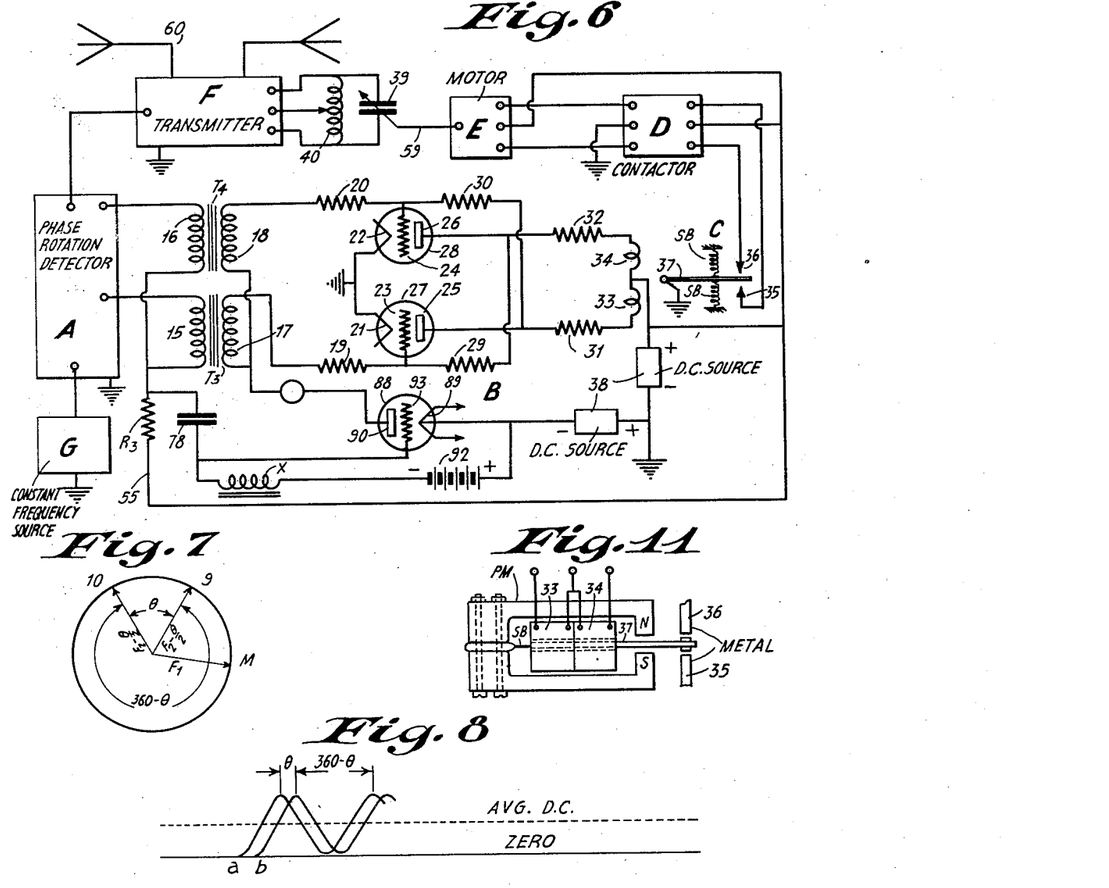

The regulator circuit of Figure 5 is similar to the one described immediately above, and illustrated in Figure 4, except that the plate current for the phase rotation detector A, which passes through the primary windings 15 and 16 of transformers $T_3$ and $T_4$ from the source 38, also passes through the primary winding P of transformer T, and resistor $R_1$, which is connected across this winding P. The anode 90 of tube 88 is connected to the control electrodes 23 and 24 in the tubes 27 and 28 of the tripping circuit through windings 17 and 18 and resistors 19 and 20. This circuit functions practically the same as the circuit illustrated in Figure 5 and described above.

Another modification of the frequency regulator circuit is shown in Figure 6. This circuit, and the operation thereof, is substantially similar to the circuits described above and in particular to the circuits of Figures 4 and 5. The present circuit, however, is different in that the grid electrode 93 of tube 88 receives its excitation voltages from the resistor $R_3$, in the lead 55 between the phase rotation detector plates and the plate supply 38, through the direct current blocking condenser 78. Negative potential sufficient to bias tube 88 to cut-off is supplied from the source 92 through reactor X to the control grid 93 of tube 88. Here, as in Figures 4 and 5, when no excitation voltage appears in the output circuit of the phase rotation detector A, the control grid of tube 88 is maintained at a negative value sufficient to bias 88 to cut-off so that the high negative potential from source 38 is prevented from reaching the control grids 23, 24 of tubes 27, 28 respectively. These grid electrodes are at equal positive potential and equal currents flow in the windings 33 and 34 so that the armature 37 stays in its central position at which it does not complete either of the circuits to the contactor D. Now assume that there is a relative shift in the transmitter frequency with respect to the reference frequency from G. A low frequency component is developed in the output of the phase rotation detectors in a manner described in detail in connection with Figure 1. This results in excitation voltage being impressed from R to the control grid 93. 88 becomes conductive and a negative potential is applied to the control grids of tubes 27 and 28. The tripping circuit functions in accordance with the relative phase shift between the oscillations from G and F and the transmitter frequency is corrected.

It should always be remembered that the proper functioning of these modified circuits depends on the requirement that the tongue 37 of the polar relay returns to the central position touching neither contact when equal currents flow in its coils 33 and 34 or when no current flows in the coils 33 and 34. When the relay is properly adjusted a spring SB holds the relay tongue in mid-position when the tripping circuit is not functioning.

The modified frequency regulator will function to correct the transmitter frequency when both the monitor and the transmitter are operating, if the beat frequency between the two is not too high or too low to pass through the transformers and filters to the tripping circuit. During the interval between signals, or if the monitor stops functioning, the frequency regulating or correcting circuits will remain inoperative. If the beat frequency between the monitor and the transmitter is too high or too low to pass through the transformers and filters the frequency correcting circuit will remain inoperative. This makes the frequency regulator quite fool proof and reliable. It should be remembered that the function of this invention is to keep the transmitter frequency tuned or regulated closely to that of the crystal monitor output. The monitor can be made small in dimensions and of great frequency constancy at moderate cost and the phase rotation detector and tripping circuits are also inexpensive, whereas a crystal controlled transmitter is usually very expensive in comparison.

Having thus described my invention and the operation thereof, what I claim is:

1. The combination with a thermionic relay having a high frequency oscillation circuit including tuning means, of means for controlling said tuning means to maintain the oscillations of said circuit at substantially constant frequency comprising, a source of oscillations of substantially constant frequency, a phase rotation detector comprising a pair of discharge tubes energized in phase by oscillations from said constant frequency source and energized by oscillations from said relay which are displaced in phase, a tripping circuit comprising differentially connected tubes having their input electrodes coupled with said phase rotation detector, driving means operatively interposed between the output electrodes of said tripping circuit tubes and said tuning means, and a regulating circuit interposed between said phase rotation detector and the control grids of said differentially connected tubes to determine the operativeness of the tripping circuit.

2. The combination of a phase rotation detector, a pair of discharge tubes coupled to a source of constant frequency oscillations and to a transmitter having a frequency determining circuit including a movable element to produce currents in the outputs of said tubes characteristic of shifts in the phase or frequency of the oscillations from said transmitter relative to the oscillations from said source, driving means connected with said movable element, tripping means including a second pair of discharge tubes each having an output circuit and having their input electrodes connected in separate input circuits coupled to electrodes in said first named pair of tubes, conductive impedances connecting the input circuit of each tube of said second pair of tubes to the output circuit of the other tube of said second pair of tubes, a relay having a winding in each of said output circuits, an armature responsive to currents in said windings cooperating with contacts in an energizing circuit for said driving means, and a regulating circuit interposed between electrodes in the tubes of said phase rotation detector and the input electrodes of the pair of tubes in said tripping means.

3. A circuit adapted to convert varying phase relation between two oscillating currents into characteristic currents comprising, a pair of discharge tubes, an input circuit connected with each of said tubes, said input circuits each being energized by one of said currents to be converted, resistive means connecting the input electrode of each of said tubes to the output electrode of the other of said tubes, a pair of windings, said windings being connected in opposition in the output circuits of said pair of tubes, a circuit for normally biasing the control grids of said tubes to a value relative to the cathodes of said tubes at which equal currents flow in said output circuits when no currents are applied to said input circuits whereby equal and opposite current flows in said windings, said biasing circuit including a variable impedance, and means actuated by the presence of currents to be converted in said input circuits for decreasing said impedance to decrease the potential on said tubes.

4. An arrangement as recited in claim 3 in which said converting circuit including said tubes has three conditions of electrical stability, and in which when said tubes are operating under normal negative bias a change in phase relation of the applied currents results in an increase in anode current in one of said tubes and a decrease in anode current in the other of said tubes and vice versa, and in which said variable impedance comprises the impedance of a discharge tube, and in which said last named means comprises a circuit for applying said currents be converted to a control grid in said last named discharge tube.

5. Means for converting variations in currents of equal frequency and constant phase differences and changing phase relationship, into positive impulses of current representative of said changing phase relationship comprising, an electric circuit having more than two conditions of electrical stability, said circuit including a plurality of electron discharge devices, each having an input circuit energized by a different one of said currents to be converted, the control electrode of one of said devices being connected to the anode of another of said devices and the anode of said last named device being connected to the control electrode of said first named device whereby an increase in the current in the anode circuit of one of said devices causes a decrease of current in the other of said devices, and a circuit coupled to the control electrodes of said tubes and actuated by said currents to be compared to render said electric circuit and discharge devices operative only when said currents are impressed on said input circuits.

6. Means for converting variations in phase relationship between two audio frequency currents into impulses of characteristic sense comprising, a pair of discharge tubes, resistances connecting the anode of one of said tubes to the control electrode of the other of said tubes and the anode of said last named tube to the control electrode of said first named tube, means for applying one of said audio frequency currents to the control electrode of one of said tubes, means for applying the other of said audio frequency currents to the control electrode of the other of said tubes, means for normally biasing the control electrodes of said tubes to a point, at which equal currents flow in the anode electrodes, when no audio frequency currents are applied to the input electrodes comprising a source of potential having its positive terminal connected to the cathodes of said tubes and its negative terminal connected to the control electrodes of said tubes by way of a path between two electrodes of an additional tube, and means for increasing current in the path between said electrodes of said additional tube when audio frequency currents are applied to said input circuits comprising a transformer having its secondary winding connected to an electrode of said additional tube and its primary winding connected with the cathodes and control electrodes of said first named tubes.

7. Means for converting variations in phase relationship between two low frequency currents into impulses of characteristic sense comprising, a pair of discharge tubes, means connecting the anode of one of said tubes to the control electrode of the other of said tubes and the anode of said last named tube to the control electrode of said first named tube, a transformer applying one of said currents to the control electrode of one of said tubes, a transformer applying the other of said currents to the control electrode of the other of said tubes, means for normally biasing said tubes to a point at which, when no alternating currents are applied to the input electrodes, equal currents flow to the anode electrodes of said tubes comprising, a source of potential having its positive terminal connected to the cathodes of said tubes and its negative terminal connected to the control electrodes of said tubes by way of the impedance of a rectifier tube, and means for decreasing the impedance of said rectifier tube when currents are applied to said input circuits comprising a transformer having its secondary winding connected to the control electrode of said rectifier tube and its primary winding connected in series with the primary windings of said first named transformers.

8. In means for converting variations in phase relationship between two audio frequency currents into impulses of characteristic sense, a pair of discharge tubes, resistances for connecting the anode of one of said tubes to the control electrode of the other of said tubes and the anode of said last named tube to the control electrode of said first named tube, a transformer applying one of said currents to the control electrode of one of said tubes, a second transformer applying the other of said currents to the control electrode of the other of said tubes, means for normally operating said tubes so that when no currents are applied to the control electrodes of said tubes, equal currents flow to the anode electrodes of said tubes comprising, a source of potential having its positive terminal connected to the cathodes of said tubes and its negative terminal connected to the control electrodes of said tubes, an additional discharge tube having its impedance connected in series with said source of potential, and means for decreasing the value of said impedance when current is applied by either of said transformers to the control electrodes of said tubes comprising a capacity connecting the primary windings of said transformers to the control grid of said additional tube.

9. Means for converting variations in phase relationship between two currents into impulses of characteristic sense comprising, a pair of discharge tubes, conductive resistances connecting the anode of one of said tubes to the control electrode of the other of said tubes and the anode of said last named tube to the control electrode of said first named tube, means for applying one of said currents to the control electrode of one of said tubes, means for applying the other of said currents to the control electrode of the other of said tubes, means for normally operating said tubes so that when no currents are applied to the control electrodes of said tubes, substantially equal currents flow between the anode and cathode electrodes of said tubes comprising, a source of potential having its positive terminal connected to the cathodes of said tubes and its negative terminal connected to the control electrodes of said tubes, an additional tube having its anode to cathode impedance connected with said source of potential, means for applying a negative potential to the control grid of said additional tube to bias the same substantially to cutoff, and means for lowering the impedance of said additional tube when said currents to be converted are applied to the control electrodes of said first named pair of tubes comprising an alternating current circuit coupled to the control electrode of said additional tube and energized by said currents to be converted.

10. In means for converting variations in phase relationship between two alternating currents into characteristic impulses, a pair of discharge tubes, resistances connecting the anode of one of said tubes to the control electrode of the other of said tubes and the anode of said last named tube to the control electrode of said first named tube, an alternating current circuit connected to one of said control electrodes for applying one of said alternating currents to the control electrode of one of said tubes, an alternating current circuit connected to the other of said control electrodes for applying the other of said alternating currents to the control electrode of the other of said tubes, means for normally energizing the electrodes of said tubes to a point at which, when no currents are applied to the control electrodes, substantially equal currents flow between the anode and cathode electrodes of said tubes comprising, a source of potential having its positive terminal connected to anodes of said tubes and its negative terminal connected to the cathodes of said tubes, an additional source of potential connected between the control electrodes and cathodes of said tubes by way of the impedance of an additional discharge tube, and resistive means energized by said alternating currents and coupled to an electrode in said additional tube for decreasing the impedance of said additional tube when currents are applied to said alternating current circuits connected to the control electrodes of said first named pair of tubes.

11. In an electrical apparatus, a pair of thermionic discharge devices, each having an anode, cathode and a control grid electrode, resistances cross-connecting the anodes and control grid electrodes of said tubes, whereby an increase in anode current of one of said tubes causes a decrease in anode current of the other of said tubes, a divided relay coil connected through resistances between the anode of said tubes, circuits for applying currents of varying phase relationship through resistances to the cathodes and control electrodes of said tubes, means for applying a potential to the control electrodes of said tubes such that unequal currents flow in the two portions of said divided relay coil when currents of varying phase relationship are applied to the control electrodes of said tubes, and a circuit connected with the control electrodes of said tubes and actuated in response to failure of said applied currents of varying phase relationship to cause substantially equal currents to flow through said tubes and the two portions of said coil.

12. In an electrical apparatus, a pair of discharge devices, each having an anode, cathode and a control grid electrode, resistances cross-connecting the anodes and control grid electrodes of said tubes, whereby an increase in anode current in one of said tubes will cause a decrease in anode current in the other of said tubes, a divided relay coil connected through resistances between the anodes of said tubes, circuits for applying energies of phase relation which may vary through resistances to the cathodes and control electrodes of said tubes, a direct current source for applying potential to the anodes of said tubes and to the control electrodes of said tubes such that one of said tubes is more conductive than the other and unequal currents flow in the two portions of said divided coil when the currents applied to the control electrodes and cathodes of said tubes are of varying phase relation, and a circuit responsive to failure of either of said applied energies of phase relation which may vary for changing the potential applied to the control electrodes of said tubes to produce currents in the relay coil and anodes of said tubes, of substantially equal value.

13. In a signalling system, means for producing two alternating currents of like frequency of constant phase displacement and varying phase sense, a pair of discharge tubes, each having an anode, a cathode and a control grid electrode, resistances cross-connecting the anodes and control grid electrodes of said tubes, whereby an increase in anode current in one of said tubes results in a decrease in anode current in the other of said tubes, a divided relay coil connected through resistances between the anodes of said tubes, circuits connecting said means through resistances to the cathodes and control electrodes of said tubes to apply one of said alternating currents to the control electrode and cathode of one of said tubes and the other of said alternating currents to the control electrode and cathode of the other of said tubes, a source of direct current connected between the anodes and cathodes of said tubes, a direct current source for applying a biasing potential to the control electrodes of said tubes such that unequal currents flow in the two portions of said divided relay coil when the phase sense of the energy applied to the input circuits varies, and a circuit interposed between said means and the control grids of said tubes and responsive to changes in the currents produced in said means for decreasing or stopping current flow through said tubes and said divided relay coil.

14. In an electrical apparatus, a pair of discharge devices each having an anode, a cathode, and a control grid, direct current conductive impedances cross-connecting the anodes and control grids of said tubes whereby an increase in anode current in one of said tubes causes a decrease in anode current in the other of said tubes and vice versa, substantially similar impedances connected between the anode and cathode of each of said tubes, alternating current circuits for applying energy of varying phase relationship between the cathodes and control grids of said tubes, means for applying operating potentials to the control grids and anodes of said tubes of such values that unequal currents flow in the said substantially similar impedances connected with the anodes of said tubes when currents of varying phase relationship are applied to the cathodes and control grids of said tubes, and an additional biasing circuit connected with the control grids of said tubes and actuated in response to the failure of either of said applied currents of varying phase relationship to alter the bias on said control grids and to cause substantially equal currents to flow through said tubes and substantially similar impedances connected between the anodes of said tubes.

GEORGE LINDLEY USSELMAN.